(12) United States Patent
Cuypers

(10) Patent No.: US 9,056,789 B2
(45) Date of Patent: Jun. 16, 2015

(54) METHOD OF TREATING STONE WOOL

(75) Inventor: Jean Marie Wilhelmus Cuypers, Linne (NL)

(73) Assignee: ROCKWELL INTERNATIONAL A/S, Hedehusene (DK)

( * ) Notice: Subject to any disclaimer, the term of this patent is extended or adjusted under 35 U.S.C. 154(b) by 278 days.

(21) Appl. No.: 13/379,166

(22) PCT Filed: Jun. 16, 2010

(86) PCT No.: PCT/EP2010/058439
§ 371 (c)(1),
(2), (4) Date: Apr. 6, 2012

(87) PCT Pub. No.: WO2010/146075
PCT Pub. Date: Dec. 23, 2010

(65) Prior Publication Data
US 2012/0183774 A1  Jul. 19, 2012

(30) Foreign Application Priority Data

Jun. 19, 2009 (EP) .................................. 09251601

(51) Int. Cl.
| | |
|---|---|
| *C04B 18/02* | (2006.01) |
| *C04B 33/13* | (2006.01) |
| *C04B 33/132* | (2006.01) |
| *C04B 35/195* | (2006.01) |
| *C04B 35/626* | (2006.01) |
| *C04B 111/00* | (2006.01) |

(52) U.S. Cl.
CPC ......... *C04B 18/023* (2013.01); *Y10T 428/2982* (2015.01); *C04B 33/13* (2013.01); *C04B 33/1324* (2013.01); *C04B 35/195* (2013.01); *C04B 35/6261* (2013.01); *C04B 35/6263* (2013.01); *C04B 35/62695* (2013.01); *C04B 2111/00758* (2013.01); *C04B 2235/3201* (2013.01); *C04B 2235/3206* (2013.01); *C04B 2235/3208* (2013.01); *C04B 2235/3232* (2013.01); *C04B 2235/3272* (2013.01); *C04B 2235/5427* (2013.01); *C04B 2235/656* (2013.01); *C04B 2235/6567* (2013.01); *C04B 2235/727* (2013.01); *C04B 2235/77* (2013.01); *C04B 2235/96* (2013.01)

(58) Field of Classification Search
CPC ................................ C04B 18/02; C04B 14/46
See application file for complete search history.

(56) References Cited

U.S. PATENT DOCUMENTS

| | | | |
|---|---|---|---|
| 2004/0140268 A1 * | 7/2004 | Oishi | ............................ 210/722 |
| 2005/0242477 A1 | 11/2005 | Haun | |
| 2009/0320361 A1 * | 12/2009 | Cuypers et al. | .......... 47/58.1 SC |

FOREIGN PATENT DOCUMENTS

| | | |
|---|---|---|
| CN | 1128243 A | 8/1996 |
| FR | 2 781 701 A1 | 2/2000 |
| JP | 9023743 A | 1/1997 |
| JP | 10279936 A | 10/1998 |
| JP | 2002187751 A | 7/2002 |
| JP | 2002348181 A | 12/2002 |
| WO | WO-00/76929 A1 | 12/2000 |
| WO | WO-2006/015647 A1 | 2/2006 |
| WO | WO-2009/080822 A1 | 7/2009 |

\* cited by examiner

*Primary Examiner* — Joseph S Del Sole
*Assistant Examiner* — Russell Kemmerle, III
(74) *Attorney, Agent, or Firm* — Tarolli, Sundheim, Covell & Tummino LLP

(57) ABSTRACT

The present invention provides a method of producing a granular product, the method comprising providing waste stone wool product of which at least 90% is in coherent form having minimum dimension at least 50 mm and which has a content of at least 10% water, by weight of the waste stone wool product; producing a base material from the stone wool by reducing the coherent stone wool to particulate form such that at least 80% by weight of the base material is in the form of particles having size not more than 40 mm, and has water content not more than 50 wt % based on the particulate base material; forming the particulate base material into granules, wherein at least 80% by weight of the granules have size not more than 40 mm, and subjecting the granules to sintering at a temperature in the range 900 to 1050° C. to form a granular product wherein at least 80% by weight of the granular product is in the form of granules having size not more than 40 mm, and during the operation of the method no binder is added. The present invention also relates to a product obtainable by the method described above.

6 Claims, No Drawings

METHOD OF TREATING STONE WOOL

FIELD OF THE INVENTION

This invention relates to methods of producing products from waste stone wool substrates, and to the product of these methods and to novel products which can be produced by these and other methods. It also relates to uses of the products of the method and the novel products.

BACKGROUND OF THE INVENTION

Mineral wool, in particular stone wool and glass wool, is used in numerous applications in various forms, for instance for sound insulation, heat insulation, fire protection, construction applications and as a horticultural growth substrate.

Once the product is no longer required, there is a need to dispose of it in an appropriate manner. This is potentially problematic in the case of mineral wool which has been used in a variety of applications, and in particular in the case of mineral wool which has been used as a horticultural growth substrate. This material eventually comes to the end of its useful life and must be disposed of. It is desired to reuse the product in some way rather than, say, sending it to landfill. However, this is not straightforward, because the end-of-life product has within it high levels of water including nutrients and other components used by the growers such as trace elements (often above 10% by weight of the substrate) and contains organic plant material and is usually surrounded by other, often organic, material, such as polymeric film.

At present, a common method of disposing of this material is by using it for the fabrication of bricks, after separating the polymeric packaging from the mineral wool growth substrate and pre-treating the waste growth substrate.

Other methods of treating waste stone wool material are known. Such methods often involve grinding the waste material in the presence of a liquid such as water. Often a binder (organic or inorganic) is added to the ground base material. The mixture can be shaped to various forms and the shaped bodies are then dried.

For instance, JP 10279936 discloses a method for recycling building waste including concrete, rock wool, timber chips, etc. This method comprises (a) recovering the waste, (b) sorting the waste, (c) pulverizing and mixing the waste, (d) adjusting the pulverized material to a desired size, (e) adding binder, which is cement milk in the case of concrete or rock wool, and mixing the blend, (f) press moulding the moulding material formed from the blend.

According to CN1128243, waste rock wool is produced through extrusion and shearing into grains, which are first mixed with cement, gypsum powder or other adhesive (binder) material and then adsorbed in certain amount of water to form a layer of enclosing film on the surface. Rock wool grains thus produced may be used as building material. No heating is mentioned.

In FR2781701A, there is disclosure of heat treatment of fibrous composites, of diverse origin, with a silica and magnesia base equally incorporating organic materials, which consists of: (a) mixing the composite in an intimate and homogeneous manner; (b) heating the mixture to 700 to 900 deg C.; and (c) simultaneously and separately recovering the combustion gas and the final inert composite. The composite may be asbestos, rock wool, glass wool or mixtures of these materials. The product of this method in the form of a ceramic composite is also claimed together with an installation for putting the method into service. The way of making the product does not mention a step of granulating.

JP9023743A describes a method in which ground waste rock wool is mixed with water and a binder such as one or more of guar gum, CMC and starch, and the mixture is subjected to the reduction of the water content to give a water content of 20 to 50%. The water-reduced mixture is extruded and ground. The produced particulate ground product is calcined at 1100 to 1190° C. to obtain a foam product having an apparent specific gravity of 0.3 to 0.5 $g/cm^3$ and capable of being used as an artificial culture medium.

JP2002187751 describes a process in which powdered waste rock wool is granulated using an inorganic hydraulic binder and water. The granules are then dried. The content of rock wool is in the range 85 to 98%.

Other publications discuss recycling of glass wool.

For instance, JP2002348181A provides a glass wool sintered material having high utility value capable of effectively reducing the volume of glass wool and recycling waste materials, a method for manufacturing the glass wool sintered material, and some kinds of treated materials containing the glass wool sintered material. The glass wool sintered material is prepared by sintering a glass wool such as a waste glass wool. It is desirable that the specific gravity of the sintered material is 0.05 g/cm3 or more. The sintered material is manufactured by heat treatment of a glass wool at temperature of 600 to 900° C. It is desirable that the heating time is 1 to 90 minutes and the volume of glass wool after sintering is 0.4 or less against the volume 1 before sintering. The sintered material is used for tiles, ecosystem protective materials, soil materials, and aggregates.

US2005242477 provides a method to transform large quantities of fibre glass waste into useful ceramic products by a low-cost manufacturing process. The method consists of reducing the fibre glass waste into a glass powder; mixing the glass powder with additives into a glass-additives mixture; granulating the glass-additives mixture into granulated particles; forming the granulated particles into a green ceramic article; and heating the green ceramic article into the ceramic product. Water and clay can be included in the processing. Only one firing step is needed with a low peak firing temperature of about 700° C. to about 1000° C. The method is said to conserve energy and natural resources compared to clay-based traditional ceramic manufacturing. High-quality impervious ceramic products can be produced by the invention.

However, it is desirable to find alternative methods of recycling mineral wool substrates, in particular stone wool substrates, especially methods which are suitable for use with water-containing substrates such as those which have already been used for horticulture.

There is also a constant desire for new mineral-based products for use in the horticultural industry and in the construction and other industries. It would therefore be desirable to be able to provide a method which not only allows recycling of waste stone wool substrates but which results in a product which has a variety of uses in several fields, segments and markets.

In our co-pending application PCT/EP2008/068208, we describe one solution to this problem whereby we disclose a method of producing a granular product, the method comprising providing a base material in particulate form such that at least 80% by weight of the base material is in the form of particles having size not more than 20 mm, and comprises mineral wool, and has water content not more than 50 wt % based on the particulate base material, mixing the particulate base material with a binder material to form a base-binder mixture, forming the base-binder mixture into granules, wherein at least 80% by weight of the granules have size not more than 40 mm, and drying the granules, wherein at least 80% by weight of the product is in the form of granules having size not more than 40 mm. Drying the granules is by heating at a temperature in the range of from 700 to 1100° C.

Specifically, the waste mineral wool product includes waste horticultural growth substrate (usually including plant residues and polymeric film) and the base material is produced by providing mineral wool in coherent form having minimum dimension at least 50 mm and having a content of at least 10% water, by weight of the waste product; producing base material from the waste mineral wool product by reducing the coherent mineral wool to particulate form such that at least 80% by weight of the base material is in the form of particles having size not more than 20 mm, and has water content not more than 50 wt % based on the particulate base material.

We find that this method provides a number of benefits.

Firstly, it is a convenient way to recycle waste mineral wool substrate and is applicable even to difficult substrates such as those which have been used in horticulture and hence are wet and combined with organic material such as plant residues and their decomposition products and polymeric film packaging materials. Such substrates can be difficult to re-use, even in known ways such as by grinding and subsequent inclusion in briquettes for formation of a mineral melt, since the organic content tends to negatively affect the performance of the cement binder commonly used for such briquettes.

Furthermore, it results in a product having beneficial product properties and hence is useful even when the starting material is not a waste product (although use of a waste product has economic and environmental advantages).

However, we find that the obligatory inclusion of binder adds expense and additional technical constraints to the method and requires use of further resources (namely binder). This is undesirable especially in the context of a method which is intended to provide a means for re-using a waste product and hence to have environmental advantages.

SUMMARY OF THE INVENTION

Accordingly, in the present invention we provide a method of producing a granular product, the method comprising providing waste stone wool product having a content of at least 10% water, by weight of the waste stone wool product; wherein at least 90 wt % of the waste stone wool product is in coherent form having minimum dimension at least 50 mm; producing a base material from the stone wool by reducing the coherent stone wool of minimum dimension at least 50 mm to particulate form such that at least 80% by weight of the base material is in the form of particles having size not more than 40 mm, and has water content not more than 50 wt % based on the particulate base material;

forming the particulate base material into granules, wherein at least 80% by weight of the granules have size not more than 40 mm, and subjecting the granules to sintering at a temperature in the range 900 to 1050° C. to form a granular product wherein at least 80% by weight of the granular product is in the form of granules having size not more than 40 mm.

This method has the benefits discussed in connection with our co-pending invention PCT/2008/068208 but without the disadvantages of having to use binder. Thus in the invention no binder is added during the operation of the method. That is, no binder is combined with the provided starting material at any point until the final granular product is produced. Surprisingly, we find that the final product can be provided in a robust and versatile form capable of being useful in a variety of applications in which it is required to retain its structure, despite the absence of binder, by means of subjecting the granules to the defined temperature so as to induce sintering when applied to stone wool starting materials.

DETAILED DESCRIPTION OF THE INVENTION

In the method of the invention, the starting material comprises a waste stone wool product which has previously been used in one of the known applications for stone wool and generally has reached the end of its useful life for that application. Such waste is often received in the form of a coherent substrate product such as a slab, block, or mat having minimum dimensions at least 50 mm, often at least 100 mm, such that this waste mineral wool is required to be reduced to particulate form in the method of the invention. The waste stone wool may also include products that already have size below 50 mm, such as plug products which tend to have minimum dimension around 20 mm, but this is usually in amounts of not more than 10% by weight of the total waste stone wool. At least 90% by weight of the waste stone wool material is in the form of larger size elements (minimum dimension at least 50 mm) that have to be reduced in size, preferably at least 95% by weight.

The well-known stone wool class of mineral fibres are used in the invention. Preferably, the stone wool fibres are formed of a composition that contains, by weight of oxides, at least 15% total CaO plus MgO plus FeO (total iron oxide being calculated and reported as FeO). Preferably the content of alkali metal oxides $Na_2O$ plus $K_2O$ is not more than 10%, especially not more than 7%, in particular not more than 3%. For instance, the stone wool may be formed of a composition having oxide contents in the following ranges:

| | |
|---|---|
| $SiO_2$ | 30 to 60% |
| $Al_2O_3$ | 4 to 30% |
| CaO plus MgO | 5 to 40% |
| CaO | 10 to 30% |
| MgO | 5 to 25% |
| FeO | 2 to 15% |
| $Na_2O$ plus $K_2O$ | up to 12% |
| $Na_2O$ | up to 6% |
| $K_2O$ | up to 6% |
| $TiO_2$ | up to 6% |

Optionally, the stone wool is formed of a composition which contains $P_2O_5$ in an amount of up to 2%.

Preferably, the waste stone wool product comprises waste horticultural growth substrate.

Other mineral wool, such as glass wool, can be used in addition to the essential waste stone wool product (such as horticultural growth substrate). Normally, this other mineral wool is waste product also. Such additional waste wool can have been used in any of the known applications for mineral wool, such as sound insulation, heat insulation, fire protection and construction. Virgin mineral wool can also be used in addition to the essential waste stone wool product but this is not preferred because the invention is especially useful when it avoids the use of virgin resources. Preferably, all the stone wool starting material is waste product from some other application.

Preferably, the waste stone wool product comprises predominantly waste horticultural growth substrate, especially greenhouse waste stone wool substrates including plastic film and roots and plants. In particular, it usually comprises at least 80%, by weight based on the total waste stone wool starting material, waste horticultural growth substrate (including any associated polymeric film and plant residues), preferably at least 90 wt % and more preferably substantially 100 wt %.

The invention is particularly useful for treatment of waste stone wool substrates which have a content of water, for instance at least 10% water (by weight based on weight of the waste stone wool). The level of water in the waste stone wool starting material is preferably at least 40 or 50 wt %. It can be up to 70 wt % but is preferably not more than 60 wt %. Horticultural growth substrates are normally provided such that when they reach the end of their useful life in this application they have water content within these ranges. Horticultural growth substrates that have reached the end of their useful life are commonly known as EOL (end-of-life) material.

The invention is also particularly useful for treating waste stone wool which is intimately combined with organic material. In the case of horticultural growth substrates, this can be plant material incorporated within the stone wool itself. It may also be polymeric packaging material around the waste slab product.

The waste stone wool can be subjected to a separation step which separates at least part of the organic material from the stone wool. This can be done for instance by shredding, milling, grinding, wind sieving or rotation.

In the invention it is essential that a base material is provided in particulate form such that at least 80% by weight of the stone wool substrate is in the form of particles having size not more than 40 mm. The "size" is the maximum dimension and this can be determined by known methods including sieving.

The base material comprises the waste stone wool but may also comprise other material, usually in dry form, provided binder is not added. Other materials include additional waste or virgin mineral wool mentioned above, coco growth substrate, sawdust, perlite and pumice. Preferably at least 30%, more preferably at least 40% and in particular at least 50%, especially at least 70%, of the base material is stone wool, by weight based on solid material. Preferably no additives at all are included in addition to the stone wool (it being essential that no binder additives are included).

Since at least 90 wt % of the stone wool substrate is provided as a waste product which is of large size, such as a slab, then this must be subjected to size reduction to provide it in particulate form. This can be done by shredding, grinding, milling or any other suitable method.

This can in itself result in some loss of water from the waste stone wool substrate. Preferably, this step results in a size-reduced product which has a content of water of not more than 60 wt %, more preferably not more than 50 wt %, especially not more than 45 wt %.

This size-reduced (preferably coarsely shredded) material can then be subjected to a second, fine grinding stage. We find that including this fine grinding stage results in granules of improved quality. Preferably, the fine grinding stage results in a particulate base material in which at least 80 wt % of the material has size not more than 20 mm, preferably not more than 15 mm and preferably not more than 10 mm.

Preferably, water content of the material subjected to the fine grinding stage is not more than 60 wt %, more preferably not more than 50 wt %, especially not more than 45 wt %. If the level of water is inappropriate, then the consistency of the base material will not allow the fine grinding to be effective.

The base material may also comprise granular products of the process of the invention recycled into the process itself.

In this specification, the water (or moisture) content is assessed at the various stages by subjecting a weighed sample to heating at 105° C. for a time long enough for a constant weight to be achieved (i.e. for any moisture to have evaporated) and reweighed, to determine the loss of weight. If the waste stone wool substrate is provided in a form such that it already has appropriately low water content, then no treatment is required. If it is provided in a form which has higher water content, then it is generally subjected to a treatment which reduces the water content. For instance, it can be subjected to pressing, drying or centrifuging.

If reduction of water content is included in the process this is normally done after any necessary size reduction to the particulate form but it can be done before size reduction. Further water removal, if required, can take place before or after the second size reduction stage (if two are used).

In the invention there is no addition of binder. That is, from the step of providing the waste stone wool material to the final generation of the end product, no binder materials are added. Surprisingly, we find that, despite this, the final product is in the form of granules that are sufficiently robust for transport, packaging and subsequent use in a variety of applications, discussed below. We believe that this is due to the choice of the heating temperature which results in sintering of the fibres of the stone wool and consequent bonding of the structure of the granules of the final product. However, the temperature is such that the fibres are only melted at their surfaces and the resulting granules retain a high degree of porosity. We find it surprising that this can be achieved without the use of added binder. The heating/sintering step and its conditions are discussed further below.

Binder materials can be inorganic, such as clay, cement, lime or gypsum. They can also be organic, e.g. starch. These are, as are other binders, excluded from addition during the execution of the method of the invention.

The base particulate material preferably contains only particulate stone wool (and water if present), as normally no other components are needed, but it can also contain plastic film and plant remnants from the starting waste material.

Preferably, no additives are included with the stone wool starting material during the course of the process. This has the advantage of minimizing the use of additional resources for the recycling process of the invention. Thus, generally there is no addition of additives of the types which have been used in prior art methods for recycling of stone wool, such as expanding/foaming agents, as well as binders.

The base material is then formed into granules. This can be done by any known method for forming granules such as in low shear or high shear mixers or, preferably, in a pelletizing device involving a cylinder or, preferably, a rotating disk. It is often convenient to add water at this stage, e.g. by spraying onto the moving mixture.

Generally, the water content of the base material subjected to granulation is not more than 60 wt %, preferably not more than 50 wt %. It can be at least 35 wt %.

The granules, before the high temperature step, generally have strength of at least 0.5 N/mm$^2$, preferably at least 1 N/mm$^2$, measured according to nen-en1097.

The granules have size at least 80 weight % not more than 40 mm, preferably not more than 30 mm. In particular they have size at least 80% in the range 4 to 25 mm. The granules preferably have a bulk density in the range of 300 to 600, preferably 350 to 500 kg/m$^3$, and the granules preferably have a specific density in the range 550 to 900, preferably in the range 600 to 800 kg/m$^3$.

In the invention, it is preferred that prior to the high temperature sintering stage the base material has a water content in the range 20 to 50 wt %, preferably at least 25 wt %, more preferably at least 35 wt %.

The granules formed by the granulation of the base material are subjected to a heating step. This is preferably done without any intermediate drying step—that is the granules are preferably fed direct from the granulation apparatus into the heating apparatus. Heating temperatures are in the range 900 to 1050° C., preferably at least 950'C.

The time required for heating the granules depends on the oven chosen, but is often in the range 5 to 30 minutes from their entry into the heating apparatus.

It is preferred that the heating step is carried out under heat in a rotary kiln, but could also be done in a static oven, fluid bed or any other suitable equipment. It is important that the granules are subjected to sintering but retain the porous nature of fibrous granules, so that the end product is still in the form of granules. Thus the heating apparatus does not subject the granules to pressure or include them in a mould. Conversely, it is important that the granules do not form a melt.

If organic material such as plastic film and plant remnants, or sawdust, is included in the base material, this is usually burnt off during the heating stage at high temperature. This can result in a reduction in total energy consumption (as the exothermic combustion of polymeric film and plant residues contributes to the drying) or can result in energy which is recycled to an earlier drying step, if one is used.

The heating step is believed to operate in two stages (within the same heating equipment). In the first phase the moisture is evaporated. In the second phase the granules themselves are heated and eventually sintered.

According to the invention, this method results in a final product which has surprisingly good porosity and absorbency properties which make it appropriate for use in a variety of applications.

For instance, it can be used as a growth substrate, in particular in industrial horticulture for pot plants or for hobby gardening or roof gardens or pot plants or growth container systems or as plant decoration material or as in house gardens or filter material.

It is also useful in applications where absorbency of fluid is required, for instance as cat litter or as floor coverings where the floor is likely to encounter fluid leakages, as a drainage layer or backfill in certain building applications.

The product is light and is of low density but has high strength and therefore can be used in construction applications such as road construction and as a replacement for gravel in the production of concrete. It can also be used in applications known for the use of perlite, pumice, diatomite, tufa or scoria.

Granular products having granular size at least 80% in the range 4 to 8 mm can be used in horticulture. Materials having granular size at least 80% in the range 4 to 8 mm, or 4 to 16 mm, can be used as drainage layers.

According to the invention, it is possible to produce using this method a novel product, which can also be produced by other methods. This novel product is a product in the form of pellets of size at least 80 wt % not more than 40 mm, wherein the pellets have a content of stone wool of at least 50 wt % by weight of the pellets. Preferably, the density of the pellets is from 650 to 850 kg/m$^3$. Preferably, the pellets have a strength of from 1 to 5 N/mm$^2$. Preferably, the pellets have a water absorption capacity of from 35 to 55%.

Water absorption capacity is measured according to nen-en1097-10.

The product preferably has porosity in the range 35 to 55% (v/v). Porosity is determined according to nen-iso 15901-1/31.

Example 1

In a preferred process, waste horticultural growth substrate comprising around 50% water and containing about 4% organic components, mainly thermoplastic wrap, is subject to coarse grinding (shredding) and then to a first drying step to a water content around 20%. After this step, it is subjected to a further fine grinding step. It is then subjected to pelletisation with additional water on a disk pelletiser. The granules, which have diameters in the range 4 to 25 mm and moisture content around 50%, resulting from pelletisation are baked at a temperature of 950 to 1000° C.

In the first phase of the baking, the moisture is evaporated. In the second phase, the stone wool itself is heated and sintered, but not melted. This results in the granular product.

The granular product has strengths around 0.7-1.3 N mm$^{-2}$. It has bulk density ranging from 350 to 540 kg m$^{-3}$ (loosely packed) and 370 to 570 kg m$^{-3}$, usually in the range 370 to 410 kg m$^{-3}$. The pellet density ranges from 570 to 860 kg m$^{-3}$ with the preponderance having pellet density in the range 660 to 780 kg m$^{-3}$.

The granular products have certain values of initial saturation and sinking time. For initial saturation, a sample of pellets of a predetermined volume is submerged in water for a predetermined period (a few minutes is adequate), the pellets are then drained, under gravity, and weighed to give the amount (by volume) of water absorbed, the results being quoted as % volume water taken up for the (bulk) volume of pellets in the original sample. The pellets have initial saturation values ranging from 44 (often at least 50) to 57% but the initial saturation can range up to 70%.

The sinking property is determined by dispersing a sample of pellets onto the surface of water and then after a few minutes (2 minutes is usually enough) the number of pellets still floating is counted. The % of floating pellets is reported. For conventional expanded clay particles, the values are relatively high, up to or more than 60%. For the pellets of the invention, there are no pellets floating at that time, thus the value is zero.

These values are compared to the same properties measured for the commercially available expanded clay product Argex. For Argex pellets, bulk density (tamped) ranges from 300 to 470 kg m$^{-3}$; pellet density ranges from 640 to 860 kg m$^{-3}$; strength ranges from 0.5 to 3.0 mm$^{-2}$; initial saturation ranges from 21 to 57%; and sinking properties range from 11 to 66%.

The pellets of the invention have good potential for use as horticultural growth media and are used as horticultural growth media. In this application, the higher values of initial saturation are beneficial for maintaining the water buffer and limiting the risk of water stress.

The pellets may also be used as a replacement for gravel in the production of concrete. In this application, the low value of sinking property is valuable because the number of pellets that remain floating on the cement mortar is minimized, thus improving the mixing properties.

Example 2

Pellets were made in accordance with the general method given in Example 1, with the specific process conditions (baking/heating time and baking/heating temperature) set out in Table 1 below. This Table also gives the values of strength, ignition loss, water absorption capacity and density of the final pellets.

TABLE 1

| Run No. | Heating Temp ° C. | Heating Time (Min) | Strength (N/mm2) | Ignition Loss (%) | Water Uptake (%) | Density (kg m$^{-3}$) |
| --- | --- | --- | --- | --- | --- | --- |
| 1 | 900 | 40 | 0.7 | 0.08 | 49.1 | 671 |
| 2 | 900 | 40 | 0.7 | 0.04 | 49.0 | 658 |
| 3 | 950 | 40 | 0.4 | 0.02 | 49.5 | 656 |
| 4 | 950 | 40 | 0.4 | 0.05 | 50.3 | 651 |
| 5 | 1000 | 40 | 0.6 | 0.05 | 49.7 | 651 |
| 6 | 1000 | 40 | 0.7 | 0.04 | 48.9 | 657 |
| 7 | 1000 | 20 | 0.6 | 0.02 | 50.2 | 649 |
| 8 | 1000 | 20 | 0.5 | 0.02 | 51.0 | 645 |
| 9 | 1000 | 20 | 0.5 | 0.00 | 50.1 | 656 |
| 10 | 1000 | 20 | 0.6 | 0.02 | 53.1 | 608 |
| 11 | 1000 | 13 | 0.3 | 0.00 | 51.4 | 639 |
| 12 | 1000 | 20 | 0.5 | 0.01 | 50.6 | 663 |
| 13 | 1000 | 20 | 0.6 | 0.01 | 49.6 | 671 |
| 14 | 1000 | 20 | 0.6 | 0.03 | 50.8 | 648 |
| 15 | 1000 | 20 | 0.8 | 0.05 | 50.7 | 660 |
| 16 | 1000 | 20 | 0.7 | 0.08 | 51.2 | 659 |

The invention claimed is:

1. A method of producing a granular product, the method comprising:

providing waste stone wool product having a content of at least 10% water, by weight of the waste stone wool product; wherein at least 90 wt % of the waste stone wool product is in coherent form having minimum dimension at east 50 mm; producing a base material from the stone wool by reducing the coherent stone wool of minimum dimension at least 50 mm to particulate form such that at least 80% by weight of the base material is in the form of particles having size not more than 40 mm, and has water content not more than 50 wt % based on the particulate base material;

forming the particulate base material into granules, wherein at least 80% by weight of the granules have size not more than 40 mm; and subjecting the granules to sintering by heating at a temperature in the range 950 to 1050° C. to form a granular product in which at least 80% by weight of the granules of the product have size not more than 40 mm, and during the operation of the method no binder is added; wherein the stone wool is formed of a composition comprising the following oxides by weight of composition:

| | |
| --- | --- |
| $SiO_2$ | 30 to 60%; |
| $Al_2O_3$ | 4 to 30%; |
| CaO plus MgO | 5 to 40%; |
| CaO | 10 to 30%; |
| MgO | 5 to 25%; |
| FeO | 2 to 15%; |
| $Na_2O$ plus $K_2O$ | up to 12%; |
| $Na_2O$ | up to 6%; |
| $K_2O$ | up to 6%; |
| $TiO_2$ | up to 6%; and |
| at least 15% total CaO plus MgO plus FeO. | |

2. A method according to claim 1 in which the waste stone wool product comprises at least 80 wt % waste horticultural growth substrate, based on total stone wool product.

3. A method according to claim 2 in which the horticultural growth substrate comprises organic material and at least some of the organic material is separated from the stone wool prior to subjecting the particulate base material to the heating step.

4. A method according to claim 1 in which the granules of base material have a content of water of at least 25% by weight of the granules.

5. A method according to claim 1 in which no additives are combined with the stone wool during the method.

6. A method according to claim 1 in which the temperature in the heating step is at least 950° C.

* * * * *